United States Patent [19]

Akashi et al.

[11] Patent Number: 4,618,236
[45] Date of Patent: Oct. 21, 1986

[54] FOCUS DETECTING APPARATUS

[75] Inventors: Akira Akashi; Akira Ishizaki; Akira Hiramatsu; Yasuo Suda, all of Yokohama; Keiji Ohtaka, Tokyo, all of Japan

[73] Assignee: Canon Kabushiki Kaisha, Tokyo, Japan

[21] Appl. No.: 667,818

[22] Filed: Nov. 2, 1984

[30] Foreign Application Priority Data

Nov. 8, 1983 [JP] Japan ................................. 58-209535

[51] Int. Cl.⁴ ........................... G03B 3/00; G01J 1/36
[52] U.S. Cl. ...................................... 354/406; 250/204
[58] Field of Search ............... 354/402, 406, 407, 408, 354/409; 250/204

[56] References Cited

U.S. PATENT DOCUMENTS

| 4,185,191 | 1/1980 | Stauffer | 250/204 |
| 4,336,450 | 6/1982 | Utagawa et al. | 250/204 X |
| 4,473,286 | 9/1984 | Watanabe et al. | 354/406 |
| 4,492,449 | 1/1985 | Oinoue et al. | 354/407 |

FOREIGN PATENT DOCUMENTS

118019  9/1980 Japan .
155331 12/1980 Japan .
2003692 3/1979 United Kingdom ................. 250/204

Primary Examiner—William B. Perkey
Attorney, Agent, or Firm—Fitzpatrick, Cella, Harper & Scinto

[57] ABSTRACT

In an apparatus wherein on the basis of a light passing through an objective lens, a plurality of images whose relative positional relation varies in accordance with the focus state of the objective lens are formed and these images are detected by photoelectric conversion element arrays and a predetermined operation is effected by the use of a plurality of photoelectrically converted signals obtained correspondingly to the respective images to thereby detect the focus state of the objective lens, there are provided first adder means for comparing the photoelectrically converted signals of the respective images in a predetermined relation and adding the smaller signal and second adder means for comparing the photoelectrically connected signals of the respective images in a predetermined relation and adding the greater signal and focus detection is effected by utilization of the result of the addition of one of the first and second adder means in accordance with the object condition, whereby accurate focus detection is made possible for any object.

3 Claims, 12 Drawing Figures

FOCUS DETECTING APPARATUS

BACKGROUND OF THE INVENTION

1. Field of the Invention

This invention relates to a focus detecting apparatus for use in optical instruments such as cameras.

2. Description of the Prior Art

In optical instruments such as cameras, focus detecting apparatuses are well known in which the amount of relative deviation of a plurality of object images formed on the basis of lights passed through different pupil areas of an objective lens is detected by a sensor to thereby detect the focus state of the objective lens.

For example, an apparatus in which a fly-eye-lens is disposed in the predetermined imaging plane (a plane equivalent to the film surface) of the photo-taking lens of a camera and a sensor array is disposed rearwardly of the fly-eye-lens, whereby the amount of deviation of images corresponding to the focus state of the photo-taking lens is detected is disclosed in U.S. Pat. No. 4,185,191 (issued Jan. 22, 1980). Also, so-called secondary imaging type apparatuses in which a plurality of imaging lenses are juxtaposed rearwardly of the predetermined imaging plane of the photo-taking lens, whereby a plurality of object images are directed to a sensor array to thereby detect the amount of deviation of the images are disclosed in Japanese Laid-open patent application No. 118019/1980 (laid open on Sept. 10, 1980) and Japanese Laid-open patent application No. 155331/1980 (laid open on Dec. 3, 1980). The apparatus of this type has a more or less greater full length than the aforementioned apparatus, but it has a merit that it does not require any special optical system such as a fly-eye-lens.

Figure 1:
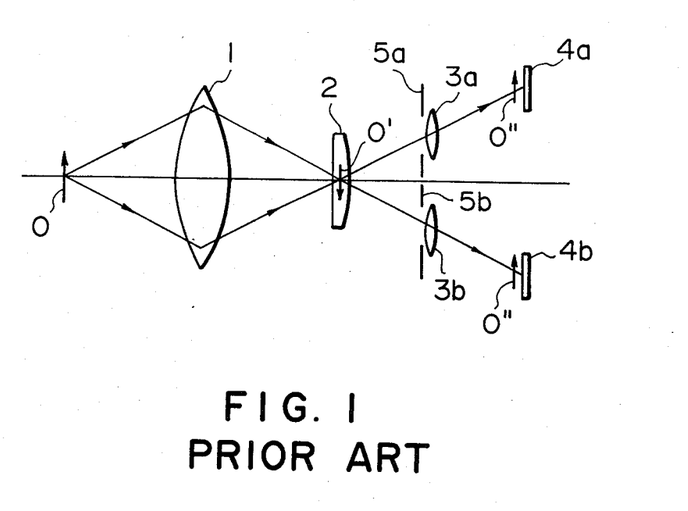
FIG. 1 shows an example of the secondary imaging type focus detecting apparatus.

The principle of the secondary imaging type focus detecting apparatus will hereinafter be described briefly by reference to FIG. 1 of the accompanying drawings. A field lens 2 having the same optic axis as that of a photo-taking lens 1 whose focus is to be adjusted is disposed in the predetermined imaging plane of the photo-taking lens 1 and two secondary imaging lenses 3a and 3b are parallel-disposed rearwardly of the field lens 2, and light-receiving sensor arrays 4a and 4b each comprising a plurality of photoelectric conversion elements are further disposed rearwardly of the secondary imaging lenses. Reference characters 5a and 5b designate stops provided near the secondary imaging lenses 3a and 3b. The field lens 2 substantially images the exit pupil of the photo-taking lens 1 on the pupil planes of the two secondary imaging lenses 3a and 3b. As a result, light fluxes entering the secondary imaging lenses 3a and 3b emerge from the regions of equal area on the exit pupil of the photo-taking lens 1 which correspond to the secondary imaging lenses 3a and 3b and which do not overlap each other. When the primary image O' of an object O formed near the field lens 2 by the photo-taking lens 1 is re-imaged as secondary images O'' on the light-receiving surfaces of the sensor arrays 4a and 4b by the secondary imaging lenses 3a and 3b, the re-imaged two secondary images O'' vary their positions on the basis of the difference between the positions in the direction of the optic axis at which the primary image O' is formed.

Figure 2A:
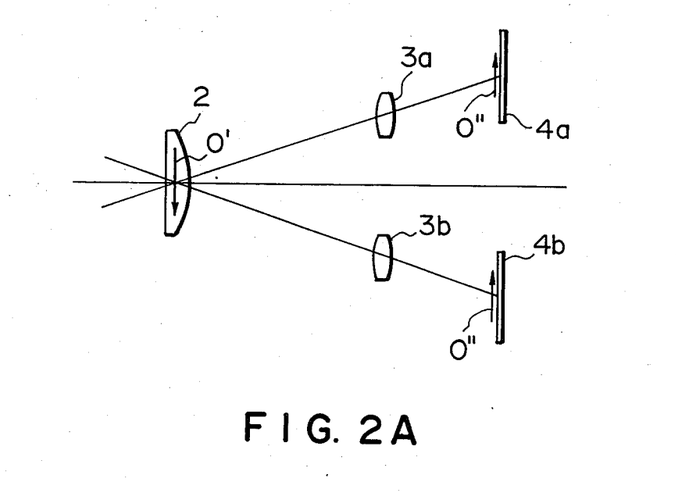
FIGS. 2A, 2B and 2C illustrate the principle of detection in the above example.
Figure 2B:
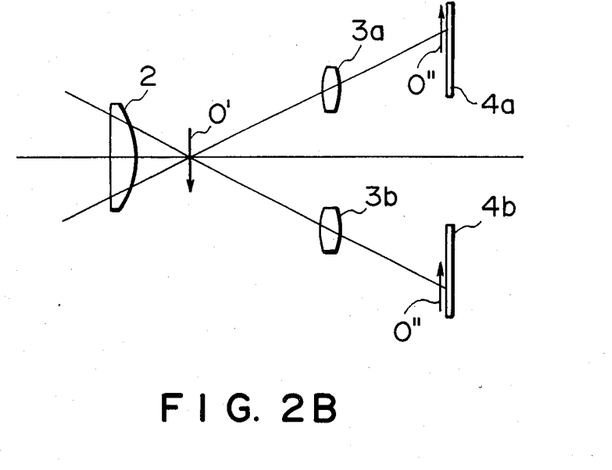
Figure 2C:
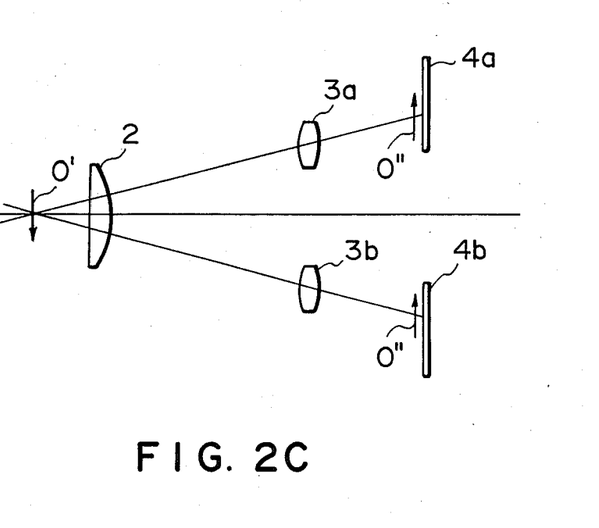

FIGS. 2A, 2B and 2C of the accompanying drawings illustrate the manner in which such phenomenon occurs. The two secondary images O'' formed on the light-receiving surfaces of the sensor arrays 4a and 4b in the near-focus state and the far-focus state as shown in FIGS. 2B and 2C with the in-focus state of FIG. 2A as the center move in the opposite direction on the light-receiving surfaces of the sensor arrays 4a and 4b. If the then distributions of quantity of light of the secondary images O'' are photoelectrically converted into electrical signals by the sensor arrays 4a and 4b and these signals are processed by an operating circuit to thereby detect the amount of relative positional deviation of the two secondary images O'', it will become possible to discriminate the focus state of the photo-taking lens 1.

As a method of processing the photoelectrically converted signals, there is, for example, a method which will hereinafter be described. When the photoelectrically converted signals of the sensor arrays 4a and 4b each having N photoelectric conversion elements are a(i) and b(i) ($i=1-N$) respectively when the secondary images O'' are photoelectrically converted by the sensor arrays 4a and 4b, in the previously described example, the operation of $$V1 = \sum_{i=1}^{N-K} \min [a(i),b(i+k)] - \sum_{i=1}^{N-K} \min [a(i+k),b(i)] \quad (1)$$

or $$V2 = \sum_{i=1}^{N-K} \max [a(i),b(i+k)] - \sum_{i=1}^{N-K} \max [a(i+k),b(i)] \quad (2)$$

is effected for a suitable constant K by an analog circuit or a digital circuit. It is to be understood that in equations (1) and (2), min [x, y] represents the smaller one of the two real numbers x and y and max [x, y] represents the greater one of the two real numbers x and y. Also, as regards K, k=1 is usually chosen, and the direction of movement of the phototaking lens 1 to the in-focus position is indicated by the positive or the negative sign of the operated value V1 or V2.

Figure 3:
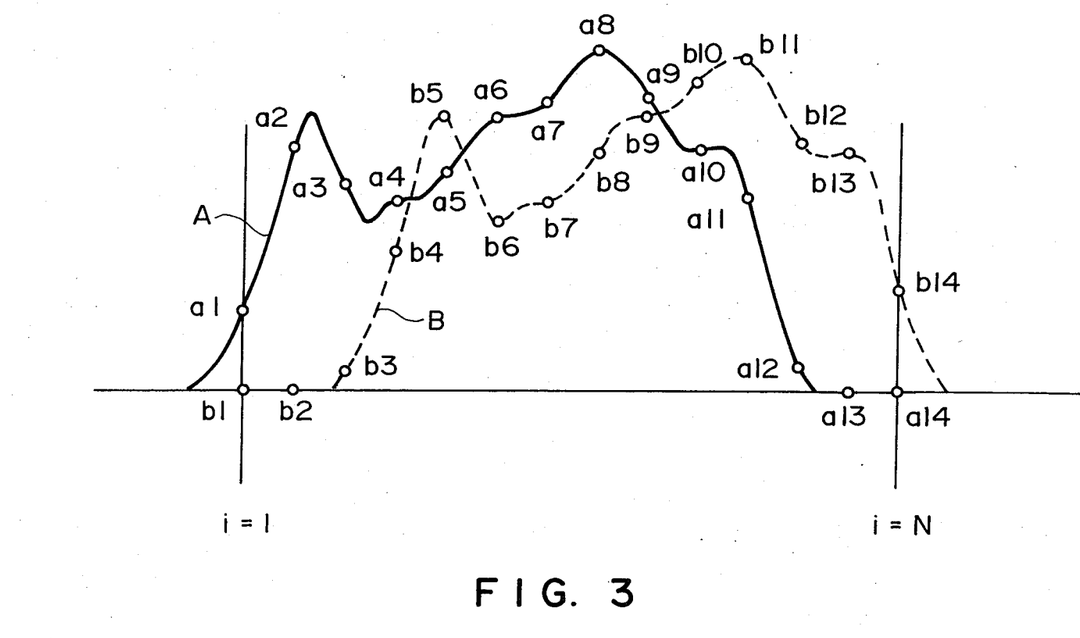
FIG. 3 shows an example of the photoelectrically converted signal in the above example.

An example of the operation of equations (1) and (2) will now be described by the use of the example of photoelectrically converted signals of FIG. 3 of the accompanying drawings. The curves A and B of FIG. 3 represent the photoelectrically converted signals a(i) and b(i) of the secondary images O'' and, in this case, it is to be understood that N=14 and the signals are operation-processed from a1, b1 to a14, b14. Assuming that the signal at the point a1 is represented as A1, the signal at the point b1 is represented as B1, and so forth, the first term V11 of equation (1) is $$V11 = \min[A1, B2] + \min[A3, B4] + \ldots + \min[A13, B14] \quad (3)$$

and if this is specifically applied to the example of signals of FIG. 3, $$V11 = B2 + B3 + B4 + \ldots + A13 \quad (4)$$

and likewise, with regard to the second term V12 of equation (1), $$V12 = \min [A2, B1] + \min [A3, B2] + \quad (5)$$

$$\min [A4, B3] + \ldots + \min [A14, B13]$$

$$= B1 + B2 + B3 + \ldots + A14.$$

Figure 4A:
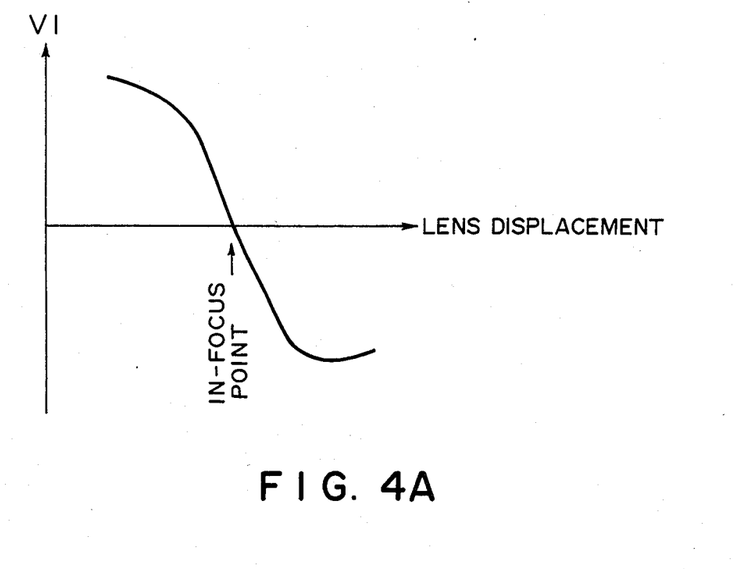
FIGS. 4A and 4B show the relations between the focus detection signal and the lens position.

Accordingly, in this case, $V1 = V11 - V12$ of equation (1) apparently becomes positive. During the in-focus, V1 is 0 and therefore, if the photo-taking 1 is designed to be driven in a predetermined direction in accordance with the positive or the negative sign of V1 as shown in FIG. 4A of the accompanying drawings, the in-focus state can be approached.

Also, in the case of equation (2), the first term V21 thereof is $$V21 = \max[A4, B2] + \max[A2, B3] + \quad (6)$$
$$\max[A3, B4] = \ldots + \max[A13, B14]$$
$$= A1 + A2 + A3 + \ldots + B14$$

and the second term V22 of equation (2) is $$V22 = \max[A2, B1] + \max[A3, B2] + \quad (7)$$
$$\max[A4, B3] + \ldots + \max[A14, B13]$$
$$= A2 + A3 + A4 + \ldots + B13.$$

Figure 4B:
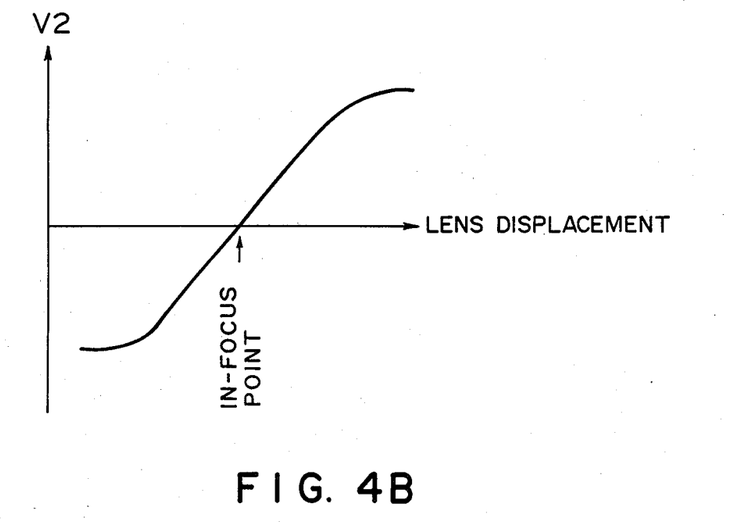

Accordingly, $V2 = V21 - V22$ of equation (2) differs in sign from V1 in the previous case, namely, becomes negative. Likewise, V2 is 0 in the in-focus and therefore, if the photo-taking lens 1 is driven in the direction opposite to the case of V1 in accordance with the positive or the negative sign of V2 as shown in FIG. 4B of the accompanying drawings, the in-focus state can be approached.

Accordingly, if the photoelectrically converted signals obtained as described above are operated by the signal processing system of equation (1) or (2), a focus detecting apparatus can be constructed entirely equivalently on the basis of the operated values of the two equations with the exception that the signs of the operated values are opposite to each other.

However, the signal processing system by equation (1) or (2) causes a phenomenon that the accuracy of one system is reduced when the photoelectrically converted signals present a certain special pattern, and the operation effect differs greatly between equations (1) and (2). Such phenomenon will now be described by reference to FIGS. 5A, 5B and 5C of the accompanying drawings. In the specific example of the photoelectrically converted signals shown in FIG. 5A, it is to be understood that for simplicity, N=8 and signal A(a20-a27) is signal outputs A20=A21=M1, A22=M2, A23=M3 and A24=A25=A26=A27=M4 (M4>M3>>M2>M1) and signal B(b20-b27) is the signal A displaced to the right by one signal. At this time, the operated values V1 and V2 of equations (1) and (2) are:

$$V1 = (M2 - M1) + (M3 - M2) + (M4 - M3) \quad (8)$$
$$= M4 - M1$$
$$V2 = (M1 - M2) + (M2 - M3) + (M3 - M4) \quad (9)$$
$$= M1 - M4$$

Accordingly, V1 and V2 of equations (8) and (9) give operated values opposite in sign to each other. This result corresponds to the example of the operation described by reference to FIG. 3.

Figure 5A:
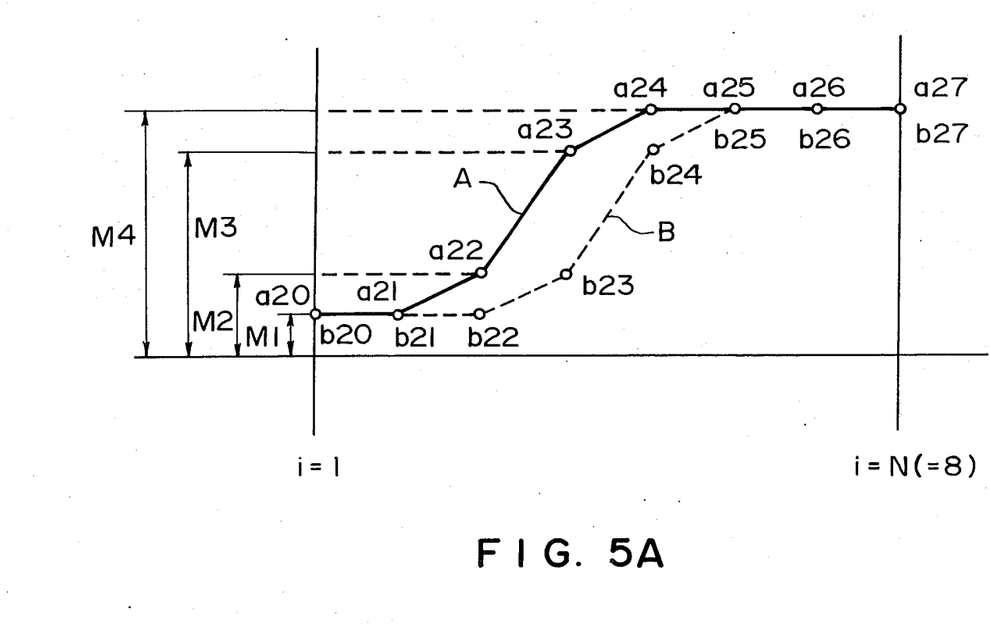
FIGS. 5A, 5B and 5C illustrate the relations between the pattern of the photoelectrically converted signal and the detection accuracy.
Figure 5B:
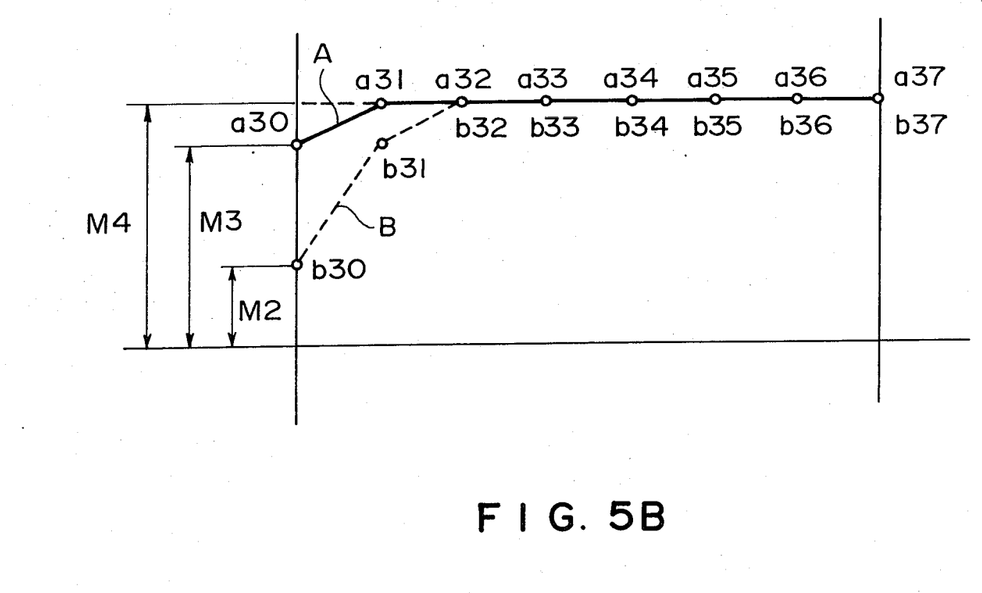

An attempt is now be made to find V1 and V2 in the signal pattern shown in FIG. 5B. This signal pattern is the signal pattern of FIG. 5A in which both signals A and B have been displaced to the left end by 3 bits and likewise, the signal A(a30-a37) and the signal B (b30-b37) are displaced by one signal. At this time, V1 and V2 are $$V1 = (M3 - M2) + (M4 - M3) \quad (10)$$
$$= M4 - M2$$
$$V2 = M3 - M4. \quad (11)$$

As is apparent from equations (8) to (11), the operated values V1 and V2 in FIG. 5B are both small as compared with the case of FIG. 5A, and particularly V2 is remarkably small. That is, in the pattern as shown in FIG. 5B, the signal processing system of equation (2) is reduced in accuracy as compared with that of equation (1) and there is an undesirable possibility that in-focus is judged by mistake in spite of the photo taking lens being not in focus and that an operated value of the opposite sign is put out under the influence of noise or the like.

Figure 5C:
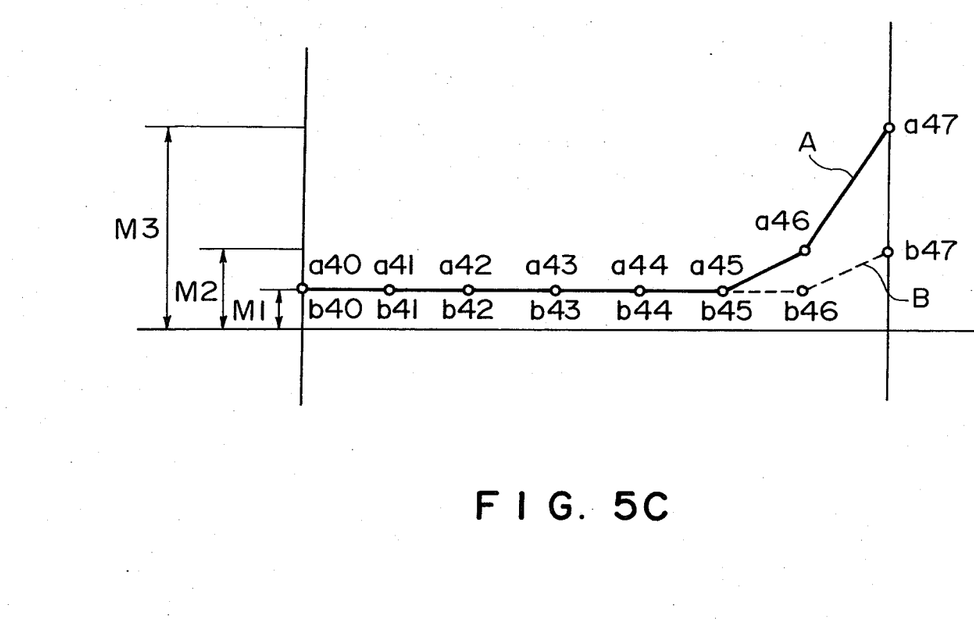

An attempt is now made to find V1 and V2 in the signal pattern shown in FIG. 5C. The signal pattern of FIG. 5C is the signal pattern of FIG. 5A displaced to the right end by 4 bits. At this time, V1 and V2 obtained from A(a40-a47) and B(b40-b47) are $$V1 = M1 \quad (12)$$
$$V2 = (M1 - M2) + (M2 - M3) \quad (13)$$
$$= M1 - M3$$

and in this case, in FIG. 5C, particularly V1 is remarkably small. That is, in the signal pattern shown in FIG. 5C, the signal processing system of equation (1) is reduced in accuracy as compared with that of equation (2).

Summing up, the signal processing systems of equations (1) and (2) do not differ in accuracy from each other in the signal pattern in which there is no signal output difference at the end portion of the operation area as shown in FIG. 5A, the system of equation (2) is inferior to the system of equation (1) in the signal pattern in which the signal output becomes sharply smaller only at the end portion of the operation area as shown in FIG. 5B, and the system of equation (1) is inferior to the system of equation (2) in the signal pattern in which the signal output becomes sharply greater only at the end portion of the operation area as shown in FIG. 5C. Accordingly, if the signal processing system of equation (1) or (2) is singly used, there will be an undesirable possibility that the focus detection accuracy is reduced in the special pattern as described above.

SUMMARY OF THE INVENTION

The present invention has been made in view of the above-noted situation and an object thereof is to provide a focus detecting apparatus which can accomplish accurate focus detection for objects under any conditions.

Other objects of the present invention will become apparent from the following detailed description of some embodiments thereof taken in conjunction with the accompanying drawings.

DESCRIPTION OF THE PREFERRED EMBODIMENTS

Figure 6:
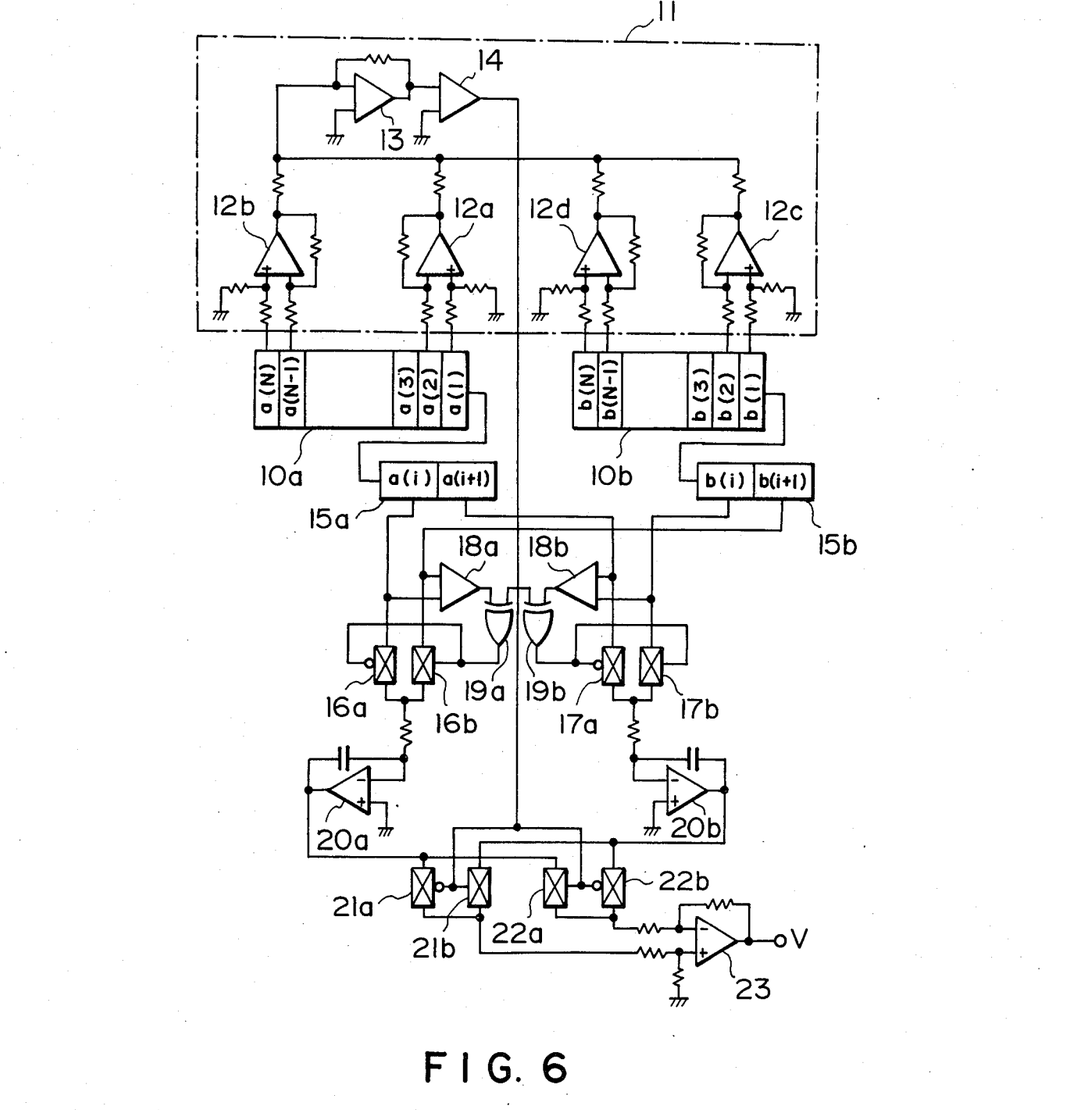
FIG. 6 shows an embodiment of the present invention.

In the embodiment of FIG. 6, the aforedescribed operated values V1 and V2 are realized as follows by an analog circuit:

$$V1 = \sum_{i=1}^{N-1} \min[a(i), b(i+1)] - \sum_{i=1}^{N-1} \min[a(i+1), b(i)] \quad (14)$$

$$V2 = \sum_{i=1}^{N-1} \max[a(i), b(i+1)] - \sum_{i=1}^{N-1} \max[a(i+1), b(i)] \quad (15)$$

In FIG. 6, reference characters 10a and 10b designate photoelectric conversion element arrays each having a number (N) of photoelectric conversion elements and putting out the aforementioned signals A and B, and the photoelectric conversion outputs of the elements thereof are a(i) and b(i) (i=1−N), respectively. Reference numeral 11 denotes an evaluation circuit which operates the photoelectrically converted signals of the total eight elements at the ends of the photoelectric conversion element arrays 10a and 10b and evaluates the selection of one of the processing systems of V1 and V2 by equations (14) and (15). As previously described, the signal patterns in which the two systems of equations (1) and (2), i.e., equations (14) and (15) which are modifications of equations (1) and (2), are weak are such that attention should be paid only to the output difference at the end portions of the signals and therefore, the evaluation circuit 11 of the present embodiment effects its operation as follows.

When the photoelectrically converted signal outputs of the eight elements at the end portions of the photoelectric conversion element arrays 10a and 10b are a(1), a(2), a(N−1), a(N), b(1), b(2), b(N−1) and b(N), the evaluation circuit operates $$C = [a(1)-a(2)] + [a(N)-a(N-1)] + [b(1)-b(2)] + \ldots + [b(N)-b(N-1)] \quad (16)$$

and if C<0, it selects V1 of equation (14)  (17a)

and if C≧0, it selects V2 of equation (15)  (17b).

The evaluation circuit 11 operates equation (16) by differential amplifiers 12a–12d and an addition amplifier 13 and determines the positive or the negative of the output C thereof by a comparator 14, which puts out a high level (hereinafter referred to as H) when C<0, and puts out a low level (hereinafter referred to as L) when C≧0.

The photoelectrically converted signals a(i) and b(i) from the photoelectric conversion element arrays 10a and 10b pass as time-serial signals through two-stage analog shift registers 15a and 15b, respectively. At this time, the photoelectric conversion element arrays 10a, 10b and the shift registers 15a, 15b are synchronously controlled by a clock generator, not shown. The shift registers 15a and 15b hold the signals a(i), a(i+1), b(i) and b(i+1) at a certain point of time, and the outputs thereof are connected to two pairs of analog switches 16a, 16b and 17a, 17b, that is, a(i), b(i+1), a(i+1) and b(i) are connected to 16a, 16b, 17a and 17b, respectively. The signals a(i) and b(i+1) are input to a comparator 18a and the signals a(i+1) and b(i) are input to a comparator 18b, and the comparator 18a and 18b put out H or L depending on the relation between the magnitudes of these signals. The comparator 18a puts out H when a(i)<b(i+1) and puts out L when a(i)>b(i+1), and the comparator 18b puts out H when a(i+1)<b(i) and puts out L when a(i+1)>b(i). The outputs of the comparators 18a and 18b are connected to exclusive logic circuits 19a and 19b, respectively, and the output of the comparator 14 in the evaluation circuit 11 is connected to the other input ends of the exclusive logic circuits 19a and 19b.

The comparator 14 puts out H when the signal processing system of equation (14) is selected and puts out L when the signal processing system of equation (15) is selected and therefore, when the output thereof is H, the outputs of the exclusive logic circuits 19a and 19b put out the inverted logics of the comparators 18a and 18b, respectively, and when the output of the comparator 14 is L, the outputs of the exclusive logic circuits 19a and 19b put out the non-inverted logics of the comparators 18a and 18b, respectively. Accordingly, if, for example, the output of the comparator 14 is H and a(i)<b(i+1), the output of the comparator 18a becomes H and the output of the exclusive logic circuit 19a becomes L, and the analog switch 16a becomes conductive and the analog switch 16b becomes non-conductive, and of the signals a(i) and b(i+1), the signal a(i) of a smaller signal value is put out at the connected outputs of the pair of switches 16a and 16b. Likewise, of the signals a(i+1) and b(i), the signal of a smaller signal value is put out at the connected outputs of the pair of switches 17a and 17b. Conversely, when the output of the comparator 14 is L, the signal of a greater signal value of the signals [a(i), b(i+1)] and [a(i+1), b(i)] is put out at the connected outputs of the two pairs of analog switches.

The outputs of the pairs of analog switches 16a, 16b and 17a, 17b are input to integrating circuits 20a and 20b, respectively, and are integrated correspondingly to the operation area of equation (14) or (15) by a control circuit, not shown. Accordingly, the outputs of the integrating circuits 20a and 20b correspond to the first and second terms, respectively, of equation (14) or (15).

The integrated outputs of the integrating circuits 20a and 20b are connected to two pairs of analog switches 21a, 21b and 22a, 22b, the output of the comparator 14 in the evaluation circuit 11 is connected to the control terminals of the pairs of switches 21a, 21b and 22a, 22b, and the connected outputs of the pairs of switches 21a, 21b and 22a, 22b are connected to the two inputs of differential amplifier 23. Accordingly, when the output of the comparator 14 is H, the switches 21b, 21a become conductive and the switches 22a, 22b become nonconductive, and the output of the integrating circuit 20b is input to the positive input of the differential amplifier 23 and the output of the integrating circuit 20a is input to the negative input of the differential amplifier 23. Conversely, when the output of the comparator 14 is L, the output of the integrating circuit 18a is input to the positive input of the differential amplifier 23 and the output of the integrating circuit 18b is input to the negative input of the differential amplifier 23.

Replacing the positive and negative inputs of the differential amplifier 23 with each other by the evaluation circuit 11 is for the purpose of coping with the fact that as previously described, in equations (14) and (15), the signs of V1 and V2 are opposite to each other for the same direction of displacement. Thus, the lens displacement signal by the operated value of equation (14) or (15) selected by the evaluation circuit 11 is put out at the output V of the differential amplifier 23.

Figure 7:
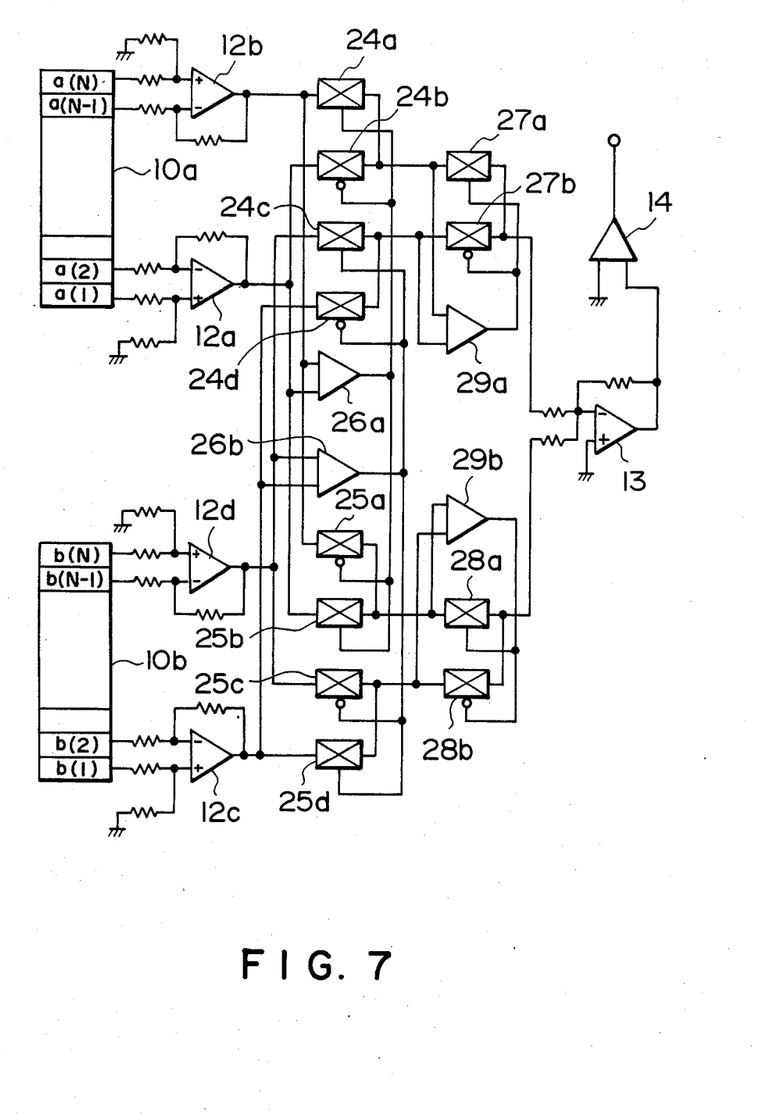
FIG. 7 shows another embodiment of the present invention.

Another embodiment of the present invention is shown in FIG. 7. FIG. 7 shows another construction of the evaluation circuit in FIG. 6, and in FIG. 7, circuits similar to those in FIG. 6 are given similar reference characters. The evaluation circuit according to the embodiment of FIG. 7 is constructed as follows. If the photoelectrically converted signal outputs of the eight elements at the end portions of photoelectric conversion element arrays 10a and 10b are a(1), a(2), a(N−1), a(N), b(1), b(2), b(N−1) and b(N), the evaluation circuit operates $$CH = \max\{[a(1)-a(2)],[a(N)-a(N-1)],[b(1)-b(2)],[b(N)-b(N-1)]\} \quad (18)$$

$$CL = \min\{[a(1)-a(2)],[a(N)-a(N-1)],[b(1)-b(2)],[b(N)-b(N-1)]\} \quad (19)$$

and if $CH+CL<0$, it selects V1 of equation (14) ... (20a) and if $CH+CL \geqq 0$, it selects V2 of equation (15) ... (20b).

In the evaluation method by equations (18), (19) and (20), attention is paid to one of the signal outputs at the end portions in which the variation is greatest, and this method is considered to be excellent in the evaluation for special pattern as compared with the previous method by equation (16) and (17).

In FIG. 7, the outputs of differential amplifiers $12a-12d$ are $[a(1)-a(2)]$, $[a(N)-a(N-1)]$, $[b(1)-b(2)]$ and $[b(N)-b(N-1)]$, respectively, and are input to four pairs of analog switches 24a, 24b; 24c, 24d; 25a, 25b; and 25c, 25d and comparators 26a, 26b, respectively. For simplicity, let it be assumed that $$aL = a(1)-a(2) \quad (21)$$

$$aM = a(N)-a(N-1) \quad (22)$$

$$bL = b(1)-b(2) \quad (23)$$

$$bM = b(N)-b(N-1) \quad (24)$$

Signals aL and aM are imput to the comparator 26a, which puts out H when aL <aM and puts out L when aL >aM. The output of the comparator 26a is connected to the control terminals of the switches 24a and 24b and therefore, greater one of the signals aL and aM is put out at the connected outputs of the pair of switches 24a and 24b. Likewise, greater one of the signals bL and bM is put out at the connected outputs of the pair of switches 24c and 24d by the comparator 26b.

The output of the comparator 26a is also connected to the control terminals of the switches 25a and 25b and therefore, smaller one of the signals aL and aM is put out at the connected outputs of the pair of switches 25a, 25b and likewise, smaller one of the signals bL and bM is put out at the connected outputs of the pair of switches 25c, 25d.

The connected outputs of the pairs of analog switches 24a, 24b; 24c, 24d; 25a, 25b; and 25c, 25d are input to other pairs of analog switches 27a, 27b and 28a, 28b, and comparators 29a, 29b. The connected outputs of the pairs of switches 24a, 24b and 24c, 24d are input to the comparator 29a, which puts out H when the connected outputs of the pair of switches 24a, 24b are greater than the connected outputs of the pair of switches 24c, 24d, and puts out L when the connected outputs of the pair of switches 24a, 24b are smaller than the connected outputs of the pair of switches 24c, 24d. Accordingly, the connected outputs of the pair of switches 27a, 27b put out greater one of the connected outputs of the pairs of switches 24a, 24b and 24c, 24d. The connected outputs of the pair of switches 24a, 24b put out greater one of the signals aL and aM and the pair of switches 24c, 24d put out greater one of the signals bL and bM and therefore, after all, the greatest one CH of the signals aL, aM, bL and bM is put out at the connected outputs of the pair of switches 27a, 27b.

Also, the smallest one CL of the signals aL, aM, bL and bM is put out at the connected outputs of a pair of analog switches 28a, 28b by a construction substantially equal to what has been described above. The signals CH and CL are added together in the addition amplifier 13, and in accordance with the positive or the negative sign of the output thereof, the comparator 14 puts out H or L. The signal processing concerned with the focus detection after that is the same as that in the embodiment shown in FIG. 6.

Further, the focus detecting apparatus of the present invention is not restricted to the construction in which only the direction of displacement of the photo-taking lens is discriminated as in the above-described embodiments. That is, it is apparent that the present invention also functions very effectively, for example, in a focus detecting apparatus which puts out the amount of displacement of the photo-taking lens.

As described above, the focus detecting apparatus according to the present invention can eliminate, by a simple construction, any reduction in accuracy for a special signal pattern occurring when the signal processing means of the focus detecting apparatus using the displacement of two images is constructed by only one system in two systems wherein the magnitudes of two photoelectrically converted signal outputs made to correspond to each other are compared and on the basis of the result of the comparison, one of said two outputs is selected and added.

What is claimed is:

1. A focus detecting apparatus for detecting a focus state of an objective lens, comprising:
   optical means for forming a plurality of images from an object;
   sensing means comprising a plurality of photosensitive elements for sensing said images and producing output signals, relative positional relation of said images on said sensing means varying in accordance with the focus state of said objective lens;
   discriminating means for discriminating the focus state of the objective lens on a basis of the outputs of said sensing means to detect the focus state of said objective lens, said discriminating means having two different processes for discriminating the focus state of said objective lens, one of said two processes being executed with signals, each of which is the smaller of the signals output from the two photosensitive elements which correspond to each other, and the other process being executed with signals, each of which is the larger of the signals output from the two photosensitive elements which correspond to each other; and evaluation means for evaluating said images on the basis of the outputs from said sensing means to select a preferred process from said two processes thereby to control said discriminating means so as to effect discrimination of the focus state of the objective lens in accordance with the preferred process.

2. A focus detecting apparatus according to claim 1, wherein said evaluation means evaluates said images on the basis of the outputs from the photosensitive elements corresponding to end portions of said images.

3. A focus detecting apparatus for detecting a focus state of an objective lens, comprising:

optical means for forming a plurality of images from an object;

sensing means including a plurality of photosensitive elements for sensing said images and producing outputs, relative positional relation of said images on said sensing means varying in accordance with the focus state of said objective lens;

discriminating means for discriminating the focus state of the objective lens on a basis of the outputs of said sensing means to detect the focus state of said objective lens, said discriminating means having two different processes for discriminating the focus state of said objective lens; and evaluation means for evaluating said images on the basis of outputs from the photosensitive elements corresponding to end portions of said images to select a preferred process from said two processes thereby to control said discriminating means to effect discrimination of the focus state of the objective lens by the preferred process.

* * * * *